(12) United States Patent
Di Costanzo et al.

(10) Patent No.: US 12,172,413 B2
(45) Date of Patent: Dec. 24, 2024

(54) CAVITATED POLYOLEFIN FILMS AND METHODS OF PRODUCTION THEREOF

(71) Applicant: CONSTAB POLYOLEFIN ADDITIVES GMBH, Rüthen (DE)

(72) Inventors: Carmelo Di Costanzo, Rüthen (DE); Andreas Strunk-Westermann, Wetter (DE); Cedric Maas, Warstein (DE); Patrick Brandhoff, Büren (DE); Sebastian Erlwein, Speichersdorf (DE); Vincenzo Campanella, Salerno (IT)

(73) Assignee: CONSTAB POLYOLEFIN ADDITIVES GMBH, Rüthen (DE)

( * ) Notice: Subject to any disclaimer, the term of this patent is extended or adjusted under 35 U.S.C. 154(b) by 223 days.

(21) Appl. No.: 17/796,948

(22) PCT Filed: Feb. 3, 2021

(86) PCT No.: PCT/EP2021/052542
§ 371 (c)(1),
(2) Date: Aug. 2, 2022

(87) PCT Pub. No.: WO2021/156304
PCT Pub. Date: Aug. 12, 2021

(65) Prior Publication Data
US 2023/0311465 A1    Oct. 5, 2023

Related U.S. Application Data

(60) Provisional application No. 62/969,180, filed on Feb. 3, 2020.

(51) Int. Cl.
*B32B 27/20*    (2006.01)
*B29C 48/00*    (2019.01)
(Continued)

(52) U.S. Cl.
CPC .............. *B32B 27/205* (2013.01); *B32B 7/12* (2013.01); *B32B 27/08* (2013.01); *B32B 27/16* (2013.01);
(Continued)

(58) Field of Classification Search
CPC ... B29C 48/0018; B29C 48/08; B29C 55/143; B29C 55/16; B29K 2023/12;
(Continued)

(56) References Cited

U.S. PATENT DOCUMENTS 4,632,869 A * 12/1986 Park .................. B32B 27/08
428/327
8,557,919 B2    10/2013 Song et al.
(Continued)

FOREIGN PATENT DOCUMENTS

CN    105385039 A *    3/2016    ............... C08J 5/18
CN    109181242 A *    1/2019    ............... C08J 3/226

OTHER PUBLICATIONS

Translation of CN-109181242-A, Li-Jun Cao, Jan. 11, 2019. (Year: 2019).*

(Continued)

*Primary Examiner* — Hai Vo
(74) *Attorney, Agent, or Firm* — Meunier Carlin & Curfman LLC

(57) ABSTRACT

Provided is a feedstock comprising a polyolefin homopolymer such as polypropylene, polybutylene terephthalate (PBT) and a pigment having a refractive index of at least 1.5 complexed by maleic anhydride functionalized polypropylene (MAH-PP). Further provided are polyolefin films having a cavitated layer comprising the feedstock and methods of making such films.

4 Claims, 2 Drawing Sheets

(51) Int. Cl.

| | |
|---|---|
| *B29C 48/08* | (2019.01) |
| *B29K 23/00* | (2006.01) |
| *B29K 67/00* | (2006.01) |
| *B29K 105/00* | (2006.01) |
| *B29K 509/00* | (2006.01) |
| *B32B 7/12* | (2006.01) |
| *B32B 27/08* | (2006.01) |
| *B32B 27/16* | (2006.01) |
| *B32B 27/32* | (2006.01) |
| *B32B 27/36* | (2006.01) |
| *C08F 110/06* | (2006.01) |
| *C08K 3/22* | (2006.01) |
| *C08L 67/02* | (2006.01) |

(52) U.S. Cl.
CPC ............ *B32B 27/32* (2013.01); *B32B 27/36* (2013.01); *C08F 110/06* (2013.01); *C08K 3/22* (2013.01); *C08L 67/02* (2013.01); *B29C 48/0018* (2019.02); *B29C 48/08* (2019.02); *B29K 2023/12* (2013.01); *B29K 2067/006* (2013.01); *B29K 2105/0032* (2013.01); *B29K 2509/00* (2013.01); *B32B 2250/24* (2013.01); *B32B 2250/40* (2013.01); *B32B 2255/10* (2013.01); *B32B 2255/205* (2013.01); *B32B 2264/1022* (2020.08); *B32B 2264/1025* (2020.08); *B32B 2264/104* (2013.01); *B32B 2270/00* (2013.01); *B32B 2307/4026* (2013.01); *B32B 2307/406* (2013.01); *B32B 2307/518* (2013.01); *B32B 2307/72* (2013.01); *B32B 2307/746* (2013.01); *B32B 2439/70* (2013.01); *B32B 2439/80* (2013.01); *B32B 2519/00* (2013.01); *C08K 2003/2241* (2013.01)

(58) Field of Classification Search
CPC ...... B29K 2067/006; B29K 2105/0032; B29K 2509/00; B32B 2250/03; B32B 2250/04; B32B 2250/05; B32B 2250/24; B32B 2250/40; B32B 2255/10; B32B 2255/205; B32B 2264/102; B32B 2264/1022; B32B 2264/1025; B32B 2264/104; B32B 2270/00; B32B 2307/4026; B32B 2307/406; B32B 2307/41; B32B 2307/516; B32B 2307/518; B32B 2307/72; B32B 2307/732; B32B 2307/746; B32B 2439/70; B32B 2439/80; B32B 2519/00; B32B 27/08; B32B 27/16; B32B 27/18; B32B 27/20; B32B 27/205; B32B 27/32; B32B 27/36; B32B 7/12; C08F 110/06; C08J 2323/12; C08J 3/226; C08K 2003/2241; C08K 3/22; C08K 9/08; C08L 23/12; C08L 67/02

See application file for complete search history.

(56) References Cited

U.S. PATENT DOCUMENTS

2012/0308789 A1   12/2012   Lockhart et al.
2016/0167347 A1*   6/2016   Jung .................. B32B 15/20
                                                                428/323

OTHER PUBLICATIONS

Translation of CN-105385039-A, Xian-Feng Yu, Mar. 9, 2016. (Year: 2016).*

International Search Report and Written Opinion issued in PCT/EP2021/052542, Mailed May 4, 2021, 9 Pages.

* cited by examiner

CAVITATED POLYOLEFIN FILMS AND METHODS OF PRODUCTION THEREOF

CROSS-REFERENCE TO RELATED APPLICATIONS

This application is a U.S. National Stage under § 371 of International Application No. PCT/EP2021/052542, filed Feb. 3, 2021, which claims the benefit of priority to U.S. Application No. 62/969,180, filed on Feb. 3, 2020, which are hereby incorporated by reference in their entireties.

FIELD OF THE INVENTION

The invention, in some embodiments, relates to the field of polymer films, and more particularly to cavitated films of a polyolefin, such as polypropylene, comprising a pigment having a refractive index of at least 1.5, methods of making such films and feedstock for use in the preparation of such films.

BACKGROUND

Opaque polymer films, and particularly biaxially oriented polypropylene (BOPP) films are widely used for many applications, such as in the packaging sector, including for packaging of food, beverages and medicines. Such films are also useful as labels, due at least partly to their printability and their ability to conform and adhere to the surface of a package or container.

BOPP is film oriented in both machine and transverse directions, producing molecular chain orientation in two directions.

For many applications, lower density BOPP films are preferred. In order to produce such lower-density films, cavitation, which involves the creation of voids within the polypropylene matrix, is often used.

Cavitation is generally achieved by use of an organic or inorganic cavitating agent, which induces voids within the polymeric material during orientation of the film structure. Organic cavitating agents are typically provided in the form of polymers, which, during extrusion disperse themselves in the predominant phase as small, substantially spherical particles, while inorganic cavitating agents are typically provided as powders. A preferred organic cavitating agent is polybutylene terephthalate (PBT).

In addition to reducing the density of the film, the voids created by the cavitation process further have the effect of scattering light thereby rendering the film opaque, which is desirable in certain applications, such as for labeling uses.

It is further often desirable to produce a white, opaque film, which is commonly achieved by inclusion of a pigment having a refractive index of at least 1.5 in the feedstock for preparation of the film.

SUMMARY OF THE INVENTION

Some embodiments of the invention relate to cavitated films of a polyolefin, such as polypropylene, comprising a pigment having a refractive index of at least 1.5, methods of making such films and feedstock for use in the preparation of such films.

Aspects and embodiments of the invention are described in the specification herein below and in the appended claims.

According to an aspect of some embodiments of the present invention, there is provided a feedstock comprising a polyolefin homopolymer; polybutylene terephthalate (PBT); and a pigment having a refractive index of at least 1.5, complexed by a maleic anhydride functionalized polyolefin, such as maleic anhydride functionalized polypropylene (MAH-PP).

In some embodiments, the pigment is selected from the group consisting of aluminum trihydrate, barium sulfate, calcium carbonate, calcium sulfate dihydrate, kaolin, zinc sulfide, magnesium carbonate, silicon dioxide, talc, titanium dioxide and zinc oxide.

In some embodiments, the pigment is selected from the group consisting of calcium carbonate, barium sulfate, zinc oxide, zinc sulfide and titanium dioxide and combinations thereof.

In some embodiments, the pigment is titanium dioxide.

In some embodiments, the polyolefin homopolymer comprises polypropylene homopolymer (homo-PP).

In some embodiments, the polyolefin homopolymer comprises polyethylene homopolymer (homo-PE).

In some embodiments, the feedstock comprises the polyolefin homopolymer at a concentration in the range of from about 80 to about 99% w/w of the total feedstock; the PBT at a concentration in the range of from about 1 to about 15% w/w of the total feedstock; the pigment at a concentration in the range of from about 3 to about 10% w/w of the total feedstock; and the MAH-PP at a concentration in the range of from about 0.1 to about 5% w/w of the total feedstock.

In some embodiments, the feedstock further comprises an additive.

In some embodiments, the additive is selected from the group consisting of an anti-blocking agent, a slip agent, an antistatic agent, an anti-fog agent, an amorphous hydrocarbon resin and combinations thereof.

Generally, the additives are added in the form of masterbatches wherein the carrier comprises a polyolefin and the quantity of additive ranges between 100 and 10,000 ppm with respect to the total weight of the monolayer film or of the core layer of a multi-layered film.

Additives may include opacifying agents, pigments, colorants, slip agents, antioxidants, anti-fog agents, anti-static agents, anti-block agents, fillers, moisture barrier additives, gas barrier additives and combinations thereof. Such additives may be used in effective amounts, which vary depending upon the property required.

Non-limiting examples of slip agents include higher aliphatic acid amides, higher aliphatic acid esters, waxes, salts of fatty acids with metals and polydimethylsiloxanes.

Non-limiting examples of anti-blocking agents may be inorganic compounds such as silicon dioxide. The amount of anti-blocking agent is optionally between 1,000 and 2,000 ppm with respect to the weight of the layer.

Non-limiting examples of anti-static agents include glycerol monostearate, aliphatic tertiary amines with saturated linear chains containing a $C_{10}$-$C_{20}$ aliphatic radical and substituted with hydroxyl-($C_1$-$C_4$) alkyl groups. Tertiary amines may be N,N-bis(2-hydroxyethyl)alkylamine containing $C_{10}$-$C_{20}$ alkyl groups, preferably $C_{12}$-$C_{18}$. The amount of anti-static agent is optionally between 1,000 and 2,000 ppm with respect to the weight of the layer.

According to a further aspect of some embodiments of the present invention, there is provided a polyolefin film comprising a cavitated layer, the cavitated layer comprising a polyolefin homopolymer; polybutylene terephthalate (PBT); and a pigment having a refractive index of at least 1.5 complexed by maleic anhydride functionalized polypropylene (MAH-PP).

According to some embodiments, the pigment is selected from the group consisting of aluminum trihydrate, barium sulfate, calcium carbonate, calcium sulfate dihydrate, kaolin, zinc sulfide, magnesium carbonate, silicon dioxide, talc, titanium dioxide and zinc oxide.

According to some embodiments, the pigment is selected from the group consisting of calcium carbonate, barium sulfate, zinc oxide, zinc sulfide and titanium dioxide and combinations thereof.

According to some embodiments, the pigment is titanium dioxide.

According to some embodiments of the polyolefin film, the polyolefin homopolymer comprises polypropylene homopolymer (homo-PP).

According to some embodiments, the polyolefin film is monoaxially oriented.

According to some embodiments, the polyolefin film is biaxially oriented.

According to some embodiments, the cavitated layer comprises the polyolefin homopolymer at a concentration in the range of from about 80 to about 99% w/w of the total feedstock; the PBT at a concentration in the range of from about 1 to about 15% w/w of the total feedstock; the pigment at a concentration in the range of from about 3 to about 10% w/w of the total feedstock; and the MAH-PP at a concentration in the range of from about 0.1 to about 5% w/w of the total feedstock.

According to some embodiments, the polyolefin film comprises at least three layers, wherein the cavitated layer is a core layer.

According to some embodiments, the polyolefin film is a three layer film.

According to some embodiments, the polyolefin film is a five layer film.

According to some embodiments, the polyolefin film is a seven layer film.

According to some embodiments, the polyolefin film is a nine layer film.

According to some embodiments, the cavitated layer further comprises an additive.

According to some embodiments, the additive is selected from the group consisting of an anti-blocking agent, a slip agent, an antistatic agent, an anti-fog agent, an amorphous hydrocarbon resin and combinations thereof.

According to some embodiments, a thickness of the cavitated layer is in the range of from about 15 to about 80 µm.

According to some embodiments, a total thickness of the film is in the range of from about 20 to about 100 µm.

According to some embodiments, the polyolefin film comprises two skin layers, wherein each of the two skin layers comprises a homo-PP and/or a polypropylene copolymer. In some such embodiments, each of the at least two skin layers has a thickness in the range of from about 0.5 to about 5 µm.

According to some embodiments, at least one of the two skin layers further comprises an additive. In some such embodiments, the additive is selected from the group consisting of a matte compound i.e. a blend of polyolefin homopolymers and/or copolymers with high-density polyethylene (HDPE) and/or medium-density polyethylene (MDPE) and combinations thereof, an anti-blocking agent, a slip agent, an antistatic agent, an anti-fog agent, a blend of polyolefin homopolymers and or copolymers with high-density polyethylene (HDPE) and/or medium-density polyethylene (MDPE) and combinations thereof.

According to some embodiments, the polyolefin film further comprises at least a first intermediate layer disposed between the core layer and a first of the two skin layers and at least a second intermediate layer disposed between the core and a second of the two skin layers. In some such embodiments, each of the first intermediate layer and the second intermediate layer comprises a homo-PP and/or a polypropylene copolymer.

According to some embodiments, each of the first intermediate layer and the second intermediate layer has a thickness in the range of from about 1 to about 5 µm.

According to some embodiments, at least one of the first intermediate layer and the second intermediate layer further comprises an additive. In some such embodiments, the additive is selected from the group consisting of $TiO_2$, PBT cavitating agent, an antistatic agent, an anti-fog agent, a hydrocarbon resin or combinations thereof.

According to some embodiments, the polyolefin film optionally comprises, in addition to the polyolefin homopolymer, amorphous hydrocarbon resins, which show a softening point in the range of from about 120 to about 180° C., as determined according to ASTM E28. Preferably, the hydrocarbon resins are low molecular weight synthetic resins, preferably having an average molecular weight between 200 and 1000. Such hydrocarbon resins are preferably formed of compounds such as styrene, methylstyrene, vinyltoluene, indene, pentadiene, cyclopentadiene and the like. Hydrogenated resins such as cyclopentadiene hydrogenated resins, are preferred. The Saybold color number according to ASTM D 158 of these hydrocarbon resins is preferably higher than 20; :::, more preferably higher than about 25.

Hydrogenated resins are preferably provided in the form of compositions comprising from 50% to 70% of the resin, the remaining part being a polyolefin homopolymer or polyolefin copolymer. Generally, the amount of such a composition is between 10-20% by weight with respect to the polyolefin homopolymer.

According to a further aspect of some embodiments of the present invention, there is provided a method of preparing a cavitated polyolefin film, the method comprising:
  providing a first composition comprising a pigment having a refractive index of at least 1.5 complexed with MAH-PP;
  providing a second composition comprising PBT in homo-PP;
  providing a third composition comprising polyolefin homopolymer;
  combining the first composition, the second composition and the third composition to provide a feedstock;
  extruding the feedstock through a first extruder to provide an extruded polyolefin polypropylene film; and
  orienting the extruded polyolefin film in at least one axial direction to provide the cavitated polyolefin film.

According to some embodiments of the method, the pigment is selected from the group consisting of aluminum trihydrate, barium sulfate, calcium carbonate, calcium sulfate dihydrate, kaolin, zinc sulfide, magnesium carbonate, silicon dioxide, talc, titanium dioxide and zinc oxide.

According to some embodiments, the pigment is selected from the group consisting of calcium carbonate, barium sulfate, zinc oxide, zinc sulfide and titanium dioxide and combinations thereof.

According to some embodiments, the pigment is titanium dioxide.

According to some embodiments of the method, the polyolefin homopolymer comprises polypropylene homopolymer (homo-PP).

According to some embodiments, the extruded polyolefin film is oriented in a single direction to provide a monoaxially oriented film.

According to some embodiments, the extruded polyolefin film is extruded in the machine direction and the transverse direction to provide a biaxially oriented film.

According to some embodiments, the first composition comprises 90% of a composition containing 70% of $TiO_2$ w/w and 10% MAH-PP w/w.

According to some embodiments, the second composition comprises from about 20% to about 70% w/w PBT in homo-PP PBT in homo-PP. According to some such embodiments, the second composition comprises 60% w/w PBT in homo-PP.

According to some embodiments, the feedstock comprises from about 1% to about 10% w/w of the first composition; from about 5% to about 20% w/w of the second composition; and from about 70% to about 94% w/w of the third composition. According to some such embodiments, the feedstock comprises 6.5% w/w of the first composition; 10% w/w of the second composition; and 83.5% w/w of the third composition.

According to some embodiments, the feedstock comprises the polyolefin homopolymer at a concentration in the range of from about 80 to about 99% w/w of the total feedstock; the PBT at a concentration in the range of from about 1 to about 15% w/w of the total feedstock; the $TiO_2$ at a concentration in the range of from about 3 to about 10% w/w of the total feedstock; and the MAH-PP at a concentration in the range of from about 0.1 to about 5% w/w of the total feedstock.

According to some embodiments, the method further comprises co-extruding two skin layers. According to some such embodiments, each of the two skin layers comprises homo-PP or a PP.

According to some embodiments, the method further comprises co-extruding at least a first intermediate layer and at least a second intermediate layer.

According to some embodiments, the method further comprises treating and winding the cavitated polyolefin film. According to some such embodiments, the treating is selected from the group consisting of treating by corona discharge, plasma, chemical treatment and combinations thereof.

According to some embodiments, the method further comprises applying a coating layer to the cavitated polyolefin film.

According to some embodiments, the method further comprises applying a metallized layer to the cavitated polyolefin film.

Unless otherwise defined, all technical and scientific terms used herein have the same meaning as commonly understood by one of ordinary skill in the art to which the invention pertains. In case of conflict, the specification, including definitions, will take precedence.

As used herein, the term "feedstock" is intended to mean a polymer-based material, optionally with non-polymer additives, typically in the form of pellets, that is fed into an extruder as a raw material for preparing a film by cast extrusion.

The term "film" as used herein is to be understood as having its customary meanings as used in the thermoplastic and packaging arts. Generally, "film" refers to a polymer sheet having a thickness of about 250 μm or less. Such films may have any suitable thickness, may be of a single polymer layer or of multiple polymer layers, typically 3 or 5 layers, although 7 and 9 layer films are also know. Such films may be manufactured using any suitable method including blown film extrusion and cast film extrusion.

As used herein, the term "titanium dioxide ($TiO_2$) complexed by maleic anhydride functionalized polypropylene (MAH-PP)" refers to a complex formed between $TiO_2$ and MAH-PP.

As used herein, the term "core layer" refers to a central layer of a multi-layered film comprising at least three layers, wherein at least one additional layer is provided on each side of the core layer.

As used herein, the term "skin layer" refers to one of the two outermost layers of a multi-layered film comprising at least three layers and having a core layer, wherein one skin layer is provided on each side of the core layer.

As used herein, the term "intermediate layer" refers to a layer of a multi-layered film comprising at least five layers, wherein between the core layer and each one of the two skin layers of the film is found at least one intermediate layer. For example, in five-layer films, one intermediate layer is found between the core layer and each one of the two skin layers of the film. In seven-layer films, two intermediate layers are found between the core layer and each one of the two skin layers of the film.

As used herein, the term "slip agent" (used herein interchangeably with the term "anti-slip agent") refers to an additive which reduces surface friction between two surfaces.

As used herein, the term "masterbatch" refers to a composition comprising an additive dispersed within a carrier, wherein the composition is intended for mixing together with a bulk polymer to form a final composition for use in the preparation of a film or layer, optionally together with additional components.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein, when a numerical value is preceded by the term "about", the term "about" is intended to indicate +/−10% of that value.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Some embodiments of the invention relate to cavitated films of a polyolefin, such as polypropylene, comprising titanium dioxide, methods of making such films and feedstock for use in the preparation of such films.

It is known in the art to prepare cavitated polyolefin films, such as cavitated polypropylene films, by including PBT as a cavitating agent in the feedstock from which the film is prepared. In the case of a multilayer film, the cavitating agent is preferably present in the core layer. The PBT disperses inside the continuous polyolefin making up the core layer, in the form of small spherical particles, typically in the order of 0.5 µm to 4.0 µm microns.

It is also known in the art to include solid white pigments, such as $TiO_2$ particles as a coloring agent in the feedstock.

Figure 2A:
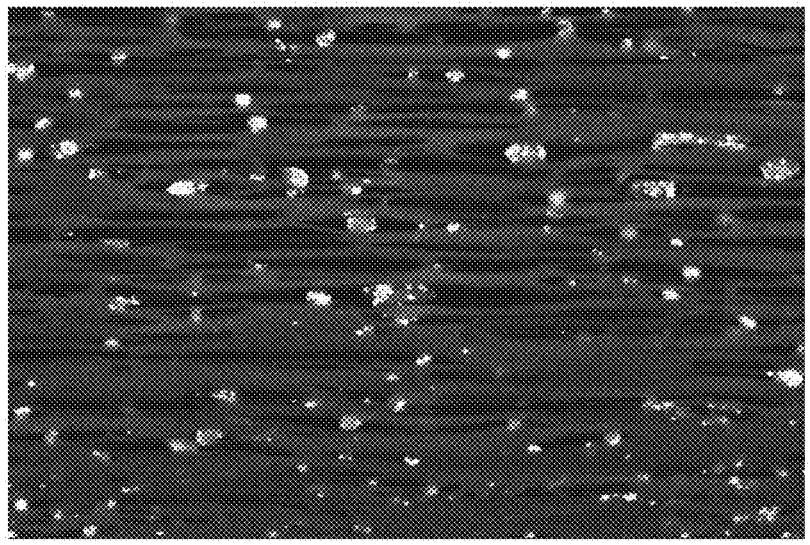
FIGS. 2A and 2B are electromicrographs showing surface topography (cross-section) of the core layer of two different five-layered cavitated polypropylene films of FIG. 1 by SEM at 6.25K magnification: a film according to the prior art (2A) and a film in accordance with an embodiment of the present invention (2B).

It has been found that when white pigments such as $TiO_2$ are present in the same feedstock as the cavitating agent such as PBT, the pigment is concentrated in the PBT domains (see FIG. 2A). This results in processing problems such as accelerated aging of the extrusion filters; accumulation of impurities in the die and consequent die build-up; and inefficient use of the white pigment, as well as lower optical properties of the film, all of which have a detrimental effect on the film quality and the plant productivity.

Figure 2B:
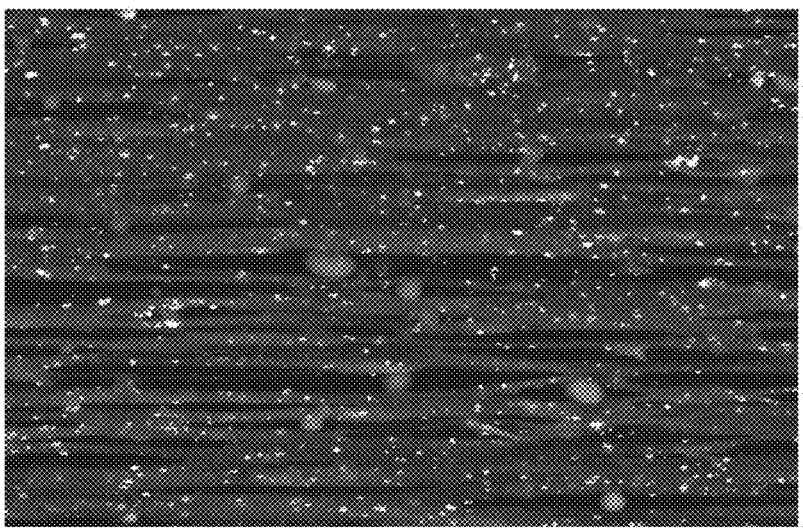

The present inventors have surprisingly found that if a pigment having a refractive index of at least 1.5, such as $TiO_2$, is complexed with maleic anhydride functionalized polypropylene (MAH-PP), instead of the pigment alone (in the form of a powder or dispersed within a polymer carrier as a masterbatch) is added to a feedstock comprising polyolefin and PBT, the pigment in the resulting film is not concentrated in the PBT domains but dispersed evenly in the polyolefin (see FIG. 2B). The resulting film has superior optical properties and is easier to process.

Maleic anhydride is known to be an excellent ligand for metal oxides, it can be easily adsorbed onto the pigment surface by electron donation. The OH groups on the pigment surface are able to react with the MA functional groups to build up chemical bonds. Breaking up of the anhydride structure of the polypropylene-graft-maleic anhydride (PP-g-MA) leads to carboxyl groups which are able to build up complex structures via acid-base interactions.

Without wishing to be bound by theory, the inventors hypothesize that while pigments such as $TiO_2$ are attracted to PBT, MAH-PP is incompatible with PBT, such that a pigment MAH-PP complex is not attracted to PBT.

Before explaining at least one embodiment in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

Many modifications and variations are possible in light of the above teachings. It is, therefore, to be understood that within the scope of the appended claims, the invention can be practiced in ways other than those specifically described.

The specific embodiments listed below exemplify aspects of the teachings herein and are not to be construed as limiting.

Throughout this application, various publications, including United States Patents, are referenced by author and year and patents by number. The disclosures of these publications and patents and patent applications in their entireties are hereby incorporated by reference into this application in order to more fully describe the state of the art to which this invention pertains.

Citation of any document herein is not intended as an admission that such document is pertinent prior art or considered material to the patentability of any claim of the present disclosure. Any statement as to content or a date of any document is based on the information available to applicant at the time of filing and does not constitute an admission as to the correctness of such a statement.

EXAMPLES

In the experimental section below, all percentages are weight percentages (w/w).

Materials and Methods

Homo-PP was obtained from TOTAL® Polymers (PPH 4030S05).

A composition comprising 60% PBT in homo-PP was obtained from CONSTAB® Polyolefin Additives GmbH (CONCAVITY® 600 PP).

A composition comprising 70% $TiO_2$ in homo-PP was obtained from CONSTAB® Polyolefin Additives GmbH (CONSTAB® CC 18170 PP).

A composition comprising 60% $TiO_2$ in homo-PP was obtained from CONSTAB® Polyolefin Additives GmbH (CONSTAB® CC 18160 PP).

MAH-PP was obtained from Arkema® (Orevac® CA100).

Anti-blocking agent was obtained from CONSTAB® Polyolefin Additives GmbH (CONSTAB® AB 06064 PPR).

Anti-static agent was obtained from CONSTAB® Polyolefin Additives GmbH (CONSTAB® AT 04082 PP).

All materials were provided in granular form.

Preparation of BOPP Films a) Cast Film Coextrusion of Films

Some embodiments of the bioriented polypropylene (BOPP) films according to the teachings herein were produced by coextruding from 3 up to 9 layers. Typically the flat web consisting of 3-9 layers was extruded through a plane die at temperature T=230° C.-250° C.) and immediately cast on a cooling drum in which cooling water (T=30° C.-35° C.) was circulated.

The screw speed of each individual extruder was set to provide an extruded layer having the desired thickness in the usual way. For multilayer films, a die having three, five, seven or nine ports, each fed by a dedicated extruder was used.

The extruded film was then further cooled in a water bath at T=30° C.-40° C.

b) Orientation of Extruded Films

The above extruded films are biaxially oriented i.e. oriented in both the machine direction (in the direction of the extrusion) and transverse direction (perpendicular to the direction of extrusion).

Biaxial orientation can be performed either simultaneous (i.e. stretching in both directions is carried out simultaneously) or sequential (i.e. stretching is carried out first in machine direction and then in transverse direction). For production of cavitated films, sequential orientation is preferred. Preferred orientation ratios are commonly from between about three to about six times the initial speed in the machine direction and between about four to about ten times the extruded width in the transverse direction.

For biaxial orientation, the following steps were carried out:
a) Machine Direction Orientation (MDO)
   Optional infra-red preheating of the extruded film;
   Preheating of the extruded film by means of a series of heated rollers (T=90° C.-130° C.); and
   Stretching of the heated, extruded film on the heated rollers (T=90° C.-130° C.), with a stretch ratio of 3:1-6.5:1, wherein the term "stretch ratio" refers to the ratio between the speed of the last heated roller to the speed of the first heated roller during stretching
b) Transverse Direction Orientation (TDO)
   Preheating of the film (T=165° C.-175° C.);
   Stretching of the film (T=150° C.-165° C.); and
   Annealing (T=140° C.-165° C.).

TDO stretching is achieved using "TD-Orienter", which essentially consists of two diverging rails running in an oven consisting of a series of connected heating and stretching zones.

The TDO stretch ratio at a given location in the oven is the ratio between the width of the film at that location and the width of the film at the inlet of the oven. The TDO stretch ratio ranges from 4:1 to 9:1.

Annealing is the last phase of the TDO stretching process, during which the rails slightly converge, while the temperature is optionally increased.

Surface Treatment

After stretching, one or both of the outer surfaces of the film is optionally treated in order to increase its surface energy to render the film receptive to metallization, coatings, printing inks and/or lamination. The desired value of surface tension is at least 36 dyne/cm.

Commonly used treatments include: corona discharge, plasma, and flame (including polarized flame).

Winding

The bioriented and treated film was then optionally wound for final use on "mother-rolls" or "jumbo rolls" having internal diameter between 400-700 mm and external diameter between 900-1200 mm.

Metallization

Outer surfaces of the film (i.e. the side facing away from the core) may optionally be metallized by deposition of a very thin layer of a metal, such as aluminum, copper, silver, chromium or mixtures thereof on an outer surface. Metallization may be carried out using conventional methods, such as vacuum metallization.

Additional Coating Layers

Additional coating layers may optionally be applied subsequent to metallization, includes priming layers, (e.g. to increase printability), antifog layers or layers to improve sealability.

A primer coating may be applied to any surface of the multilayered films by applying a continuous coating of a primer material. Such primer materials are well known in the art and include, for example, epoxy and poly(ethylene imine) (PEI) materials.

Example 1: Five-Layered Bioriented Cavitated Film Comprising Titanium Dioxide

Figure 1:
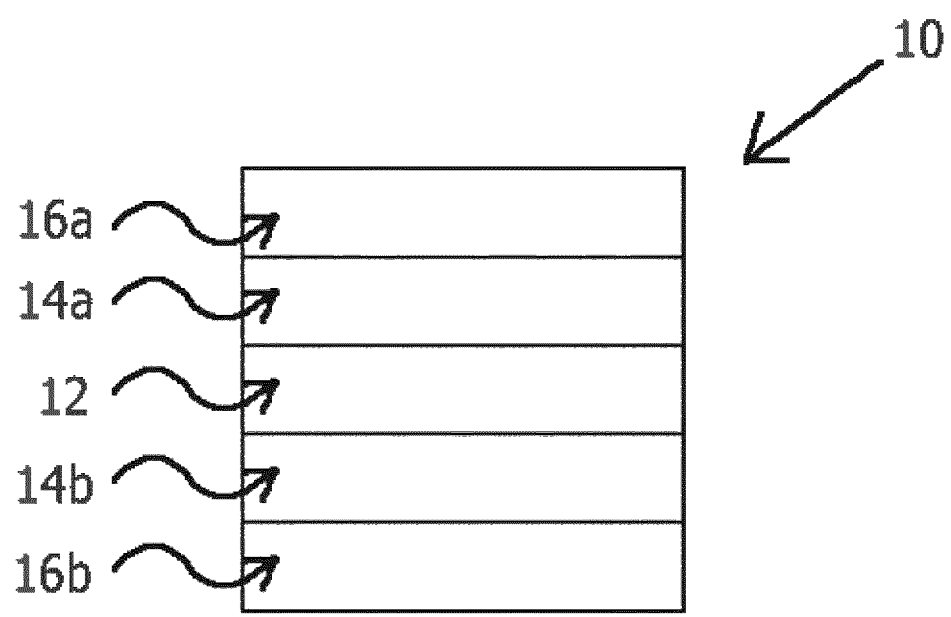
FIG. 1 is a schematic representation of the structure of a five-layered sheet in accordance with an embodiment of the present invention.

Referring now to FIG. 1, there is shown a five-layered sheet 10, comprising a core layer 12; a first and second skin layer 16a and 16b, respectively, positioned one on either side of core layer 12; and a first and second tie (intermediate layer) 14a and 14b, respectively, wherein first tie layer 14a is positioned between core layer 12 and first skin layer 16a, and wherein second tie layer 14b is positioned between core layer 12 and second skin layer 16b.

The layers were co-extruded from a 5-twin screw extrusion system. Core layer 12 were extruded from main extruder (I); skin layers 16a and 16b were extruded from a first and a second satellite extruder, (II and III) respectively, positioned on opposite sides of the main extruder; and tie layers 14a and 14b were extruded from a third and a fourth satellite extruder, (IV and IV) respectively, wherein the third satellite extruder was positioned between the main extruder and the first satellite extruder, and the fourth satellite extruder was positioned between the main extruder and the second satellite extruder. The first satellite extruder was at the casting side, while the second satellite extruder was in proximity to a water bath.

The resultant sheet was biaxially oriented, using methods as known in the art.

Reference Sample

A reference core feedstock and a reference tie layer (intermediate layer) feedstock were prepared, each comprising the following mixture:
   i) 6% (w/w of feedstock) of a composition comprising 60% $TiO_2$ in homo-P;
   ii) 10% (w/w of feedstock) of a composition comprising 60% PBT in homo-PP;
   iii) 2% (w/w of feedstock) of anti-static composition; and
   iv) 82% (w/w of feedstock) homo-PP.

Each of the core and tie layer comprised 6% w/w PBT and 3.6% w/w $TiO_2$.

A skin layer feedstock was prepared, comprising the following mixture:
   i) 99% (w/w of skin layer feedstock) of a terpolymer of polypropylene; and
   ii) 1% (w/w of skin layer feedstock) of anti-blocking agent.

The components for each feedstock were either blended in the solid phase prior to introduction into an extruder or introduced substantially simultaneously into an extruder.

The feedstocks were introduced into the 5 twin screw extruder system as follows:
Extruder IV: First skin layer
Extruder II: Frist tie layer
Extruder I: Core layer
Extruder III: Second tie layer
Extruder V: Second skin layer.

Extrusion conditions were as specified in Table 1 below.

TABLE 1

| Extruder | Main | Sat 1 | Sat 2 | Sat 3 | Sat 4 |
| --- | --- | --- | --- | --- | --- |
| Layer | core | skin | Skin | tie | tie |
| Output (kg/h) | 187.7 | 6.8 | 6.5 | 14.6 | 13.8 |
| Layer thickness (μm) | 32.9 | 1.0 | 1.0 | 2.5 | 2.5 |
| Barrel temp (° C.) | 25– | 240 | 240 | 240 | 240 |

The casting conditions were as follows:
Cast roll speed: 14.3-16.0 m/min
Cast roll temperature 35° C./water bath 30° C.
The extruded films were then biaxially oriented according to the following conditions:

Machine Direction Stretching (MDO)
  Stretch ratio 5.26:1
  Roller temperature: preheat 125° C. /stretch 120° C./annealing 125° C.
Transverse Direction Stretching (TDO)
  TD stretching ratio (calculated according to the local width of the rails)=7.89 max (maximum/inlet) 7.05 outlet (outlet/inlet)
  TDO oven temperature: preheat 176-174-171-165° C./stretch 158-158° C./annealing 165° C.
The reference film formed had a density of 0.65 g/cm$^3$ not accumulate in the PBT domains but instead exist primarily as an individual dispersed phase. The increased uniformity of distribution of $TiO_2$ results in better optical properties, such as higher gloss of the film as compared to the reference sample.

The optical properties of film #1 as compared to that of the reference film are shown in 30 Table 2. As seen in Table 2, the gloss of test film #1, prepared in accordance with the principles of the present invention, is significantly higher than those of the reference sample.

Optical properties are shown in Table 2 below.

TABLE 2

|  | Thickness (μm) | Optical Transmission | Optical density | Gloss Air side |  |  |  | Chill roll side |  |  |  |
|---|---|---|---|---|---|---|---|---|---|---|---|
|  |  |  |  | 20° | 60° | 85° | 45° | 20° | 60° | 85° | 45° |
| Reference | 39 | 19.3 | 0.714 | 11.5 | 46.6 | 82.9 | 52.4 | 8.4 | 40.8 | 81 | 45.3 |
| Test |  | 19.2 | 0.717 | 13.4 | 66.2 | 88.3 | 62.3 | 8.6 | 47.3 | 84.4 | 47.8 |

Optical Properties

Transmission and optical density were measured according to ASTM D1003.

Gloss was measured on the chill roll side and the air side according to ASTM D2457.

Results

A photomicrograph of a cross-section of the core layer of the reference film is presented in FIG. 2A, in which the particles of $TiO_2$ are seen to reside preferentially in the PBT domains. As already discussed, this preferential agglomeration of $TiO_2$ in the PBT domains may cause processing problems (such as shorter life of the filters, die build-up etc.) during production.

Film #1

The skin layer and tie layer feedstocks were prepared as described above for the reference sample.

A composition comprising $TiO_2$ complexed by maleic anhydride functionalized polypropylene (MAH-PP) was prepared by combining 90% of a composition comprising 70% $TiO_2$ in homo-PP with 10% MAH-PP.

A core layer feedstock in accordance with the principles of the present invention was prepared comprising the following mixture:
  i) 6.0% (w/w of feedstock) of the composition comprising $TiO_2$ complexed by MAH-PP;
  ii) 10% (w/w of feedstock) of the composition comprising 60% PBT in homo-PP;
  iii) 2% (w/w of feedstock) of antistatic composition; and
  iv) 82% (w/w of total feedstock) homo-PP.

The components were blended in the solid phase prior to introduction into the extruder.

The core layer feedstock comprised 6% w/w PBT and 3.7.8% w/w $TiO_2$ and 0.6% MAH-PP.

The film #1 had a density of 0.70 g/cm$^3$

The film was prepared and optical properties measured as described above for the reference sample.

Results

A photomicrograph of a cross-section of the core layer of film #1 is presented in FIG. 2B. It can be seen that, contrary to the prior art reference film of FIG. 2A, $TiO_2$ particles do not accumulate in the PBT domains but instead exist primarily as an individual dispersed phase.

Example 2: Three-Layered Film Comprising Titanium Dioxide

A three-layered film is prepared comprising a core layer as described in film #1, and further comprising two skin layers, each comprising homo-PP or a polypropylene polymer.

The three-layered film is prepared by cast film coextrusion of:
  homo-PP or a polypropylene polymer (extruder II);
  the core layer feedstock as for Film #1 (extruder I)
  homo-PP or a polypropylene polymer (extruder III).

Each skin layer may (extruder II and III) optionally comprise at least one additive selected from the group consisting of a matte compound, an anti-blocking agent, a slip agent, an anti-fog agent, an antistatic agent, a blend of polyolefin homopolymers and or copolymers with high-density polyethylene (HDPE) and/or medium-density polyethylene (MDPE), or combinations thereof. The three-layered film produced has a core layer of thickness in the range of from about 29 to about 63 μm and each skin layer has a thickness in the range of from about 1 to about 2 μm.

Example 3: Five-Layered Film Comprising Calcium Carbonate

A five-layered film is prepared as described in Example 1, except that titanium dioxide is replaced by the same amount of calcium carbonate.

Example 4: Three-Layered Film Comprising Barium Sulfate

A three-layered film is prepared as described in Example 2, except that titanium dioxide is replaced by the same amount of barium sulfate.

Example 5: Five-Layered Film Comprising Zinc Oxide

A five-layered film is prepared as described in Example 1, except that titanium dioxide is replaced by the same amount of zinc oxide.

Example 6: Three-Layered Film Comprising Barium Sulfate

A three-layered film is prepared as described in Example 2, except that titanium dioxide is replaced by the same amount of zinc sulfide.

The invention claimed is:

1. A polyolefin film comprising a cavitated layer, said cavitated layer comprising a polyolefin homopolymer; polybutylene terephthalate (PBT) as a cavitating agent; and a pigment having a refractive index of at least 1.5 complexed by maleic anhydride functionalized polypropylene (MAH-PP), wherein said complexed pigment is not concentrated in the PBT domain and is dispersed evenly in said polyolefin homopolymer, wherein the pigment is titanium dioxide, further wherein said polyolefin film is biaxially oriented.

2. The polyolefin film according to claim 1, wherein said pigment is selected from the group consisting of: aluminum trihydrate, barium sulfate, calcium carbonate, calcium sulfate dihydrate, kaolin, zinc sulfide, magnesium carbonate, silicon dioxide, talc, and zinc oxide.

3. The polyolefin film according to claim 1, wherein said polyolefin homopolymer comprises polypropylene homopolymer (homo-PP).

4. The polyolefin film according to claim 1, wherein the polyolefin film is selected from the group consisting of:
 a three layer film, and a five layer film;
 wherein said cavitated layer is a core layer of the polyolefin film.

* * * * *